(12) United States Patent
Lee

(10) Patent No.: US 12,189,145 B2
(45) Date of Patent: Jan. 7, 2025

(54) ROTARY-TYPE DISPLAY APPARATUS USING SEMICONDUCTOR LIGHT-EMITTING DEVICE

(71) Applicant: LG ELECTRONICS INC., Seoul (KR)

(72) Inventor: Sungwhan Lee, Seoul (KR)

(73) Assignee: LG ELECTRONICS INC., Seoul (KR)

( * ) Notice: Subject to any disclaimer, the term of this patent is extended or adjusted under 35 U.S.C. 154(b) by 289 days.

(21) Appl. No.: 17/779,889

(22) PCT Filed: Dec. 3, 2019

(86) PCT No.: PCT/KR2019/016904
§ 371 (c)(1),
(2) Date: May 25, 2022

(87) PCT Pub. No.: WO2021/107239
PCT Pub. Date: Jun. 3, 2021

(65) Prior Publication Data
US 2023/0004019 A1    Jan. 5, 2023

(30) Foreign Application Priority Data
Nov. 27, 2019  (KR) .......................... 10-2019-0154668

(51) Int. Cl.
*G02B 30/54* (2020.01)

(52) U.S. Cl.
CPC .................................... *G02B 30/54* (2020.01)

(58) Field of Classification Search
CPC ....... G02B 30/54; G02B 30/27; H01L 33/483; H01L 33/52; H01L 33/62; H01L 25/0753;
(Continued)

(56) References Cited

U.S. PATENT DOCUMENTS

| 6,037,876 A | * | 3/2000 | Crouch | ..................... G09F 9/33 |
| | | | | 340/815.53 |
| 10,536,690 B2 | * | 1/2020 | Kaehler | ............... H04N 13/398 |

(Continued)

FOREIGN PATENT DOCUMENTS

| CN | 108986725 | 12/2018 |
| CN | 109547771 | 3/2019 |

(Continued)

OTHER PUBLICATIONS

PCT International Application No. PCT/KR2019/016904, International Search Report dated Aug. 20, 2020, 9 pages.

(Continued)

*Primary Examiner* — Hoi C Lau
(74) *Attorney, Agent, or Firm* — LEE, HONG, DEGERMAN, KANG & WAIMEY

(57) ABSTRACT

The present disclosure relates to a rotary-type display apparatus using, for example, a light emitting diode (LED) which is a semiconductor light-emitting device, wherein the apparatus can be applied to technical fields related to display apparatuses. According to the present invention, a rotatory-type display apparatus using a light-emitting device comprises: a fixing part including a motor; a rotating part located on the fixing part and rotated by the motor; and a light source module which includes at least two rod-shaped panels coupled to the rotating part and arranged radially, and light-emitting device arrays respectively disposed on the panels in the longitudinal direction, wherein the height of the at least two panels from the rotating part may be different.

7 Claims, 13 Drawing Sheets

(58) Field of Classification Search
CPC ..... H01L 25/167; G06F 3/167; G06F 3/1423; G06F 3/1446; G09G 3/005; G09G 3/003; G09G 3/02; G09G 3/32; G09G 3/001; G09G 3/06

See application file for complete search history.

(56) References Cited

U.S. PATENT DOCUMENTS

| | | | |
|---|---|---|---|
| 11,138,915 B2* | 10/2021 | Rohena | G09G 3/02 |
| 11,159,783 B2* | 10/2021 | Kaehler | H04N 13/32 |
| 11,361,689 B2* | 6/2022 | Onuki | G06F 3/1423 |
| 11,448,392 B2* | 9/2022 | Zhao | F04D 29/30 |
| 11,495,154 B2* | 11/2022 | Rohena | F04D 29/005 |
| 2002/0148148 A1 | 10/2002 | Smith | |
| 2008/0186155 A1* | 8/2008 | Spencer | G02B 30/54 |
| | | | 340/815.45 |
| 2017/0223344 A1* | 8/2017 | Kaehler | H04N 13/307 |
| 2019/0035317 A1* | 1/2019 | Rohena | G02B 27/017 |
| 2020/0092538 A1* | 3/2020 | Kaehler | G02B 30/27 |
| 2021/0192996 A1* | 6/2021 | Onuki | G09F 19/12 |
| 2022/0046227 A1* | 2/2022 | Kaehler | H04N 13/307 |
| 2022/0051597 A1* | 2/2022 | Rohena | H04N 5/2627 |
| 2022/0341568 A1* | 10/2022 | Lee | H02J 50/10 |
| 2022/0343812 A1* | 10/2022 | Woo | G09F 9/33 |
| 2022/0377916 A1* | 11/2022 | Park | G09F 11/02 |
| 2022/0381423 A1* | 12/2022 | Kang | G09F 11/02 |
| 2023/0004019 A1* | 1/2023 | Lee | G09F 27/005 |
| 2023/0018982 A1* | 1/2023 | Rohena | G08B 21/18 |
| 2023/0326397 A1* | 10/2023 | Lee | G09F 9/30 |
| | | | 345/30 |

FOREIGN PATENT DOCUMENTS

| | | |
|---|---|---|
| JP | 06-342262 | 12/1994 |
| KR | 10-2004-0022038 | 3/2004 |
| KR | 10-2007-0083412 | 8/2007 |
| KR | 10-2011-0108463 | 10/2011 |
| WO | 2019023489 | 1/2019 |

OTHER PUBLICATIONS

European Patent Office Application Serial No. 19953936.2, Search Report dated Nov. 8, 2023, 9 pages.

* cited by examiner

ROTARY-TYPE DISPLAY APPARATUS USING SEMICONDUCTOR LIGHT-EMITTING DEVICE

CROSS-REFERENCE TO RELATED APPLICATIONS

This application is the National Stage filing under 35 U.S.C. 371 of International Application No. PCT/KR2019/016904, filed on Dec. 3, 2019, which claims the benefit of earlier filing date and right of priority to Korean Application No. 10-2019-0154668, filed on Nov. 27, 2019, the contents of which are all hereby incorporated by reference herein their entirety.

TECHNICAL FIELD

The present disclosure is applicable to display-device-related technical fields, and relates to a rotary-type display device using a light-emitting diode (LED), which is a semiconductor light-emitting element.

BACKGROUND ART

Recently, in the field of display technology, display devices having excellent characteristics, such as thinness and flexibility, have been developed. Meanwhile, currently commercialized major displays are represented by a liquid crystal display (LCD) and an organic light-emitting diode (OLED).

However, the LCD has problems in which the response time is slow and it is difficult to realize flexibility, and the OLED has problems in which the lifespan thereof is short and the production yield thereof is low.

Meanwhile, a light-emitting diode (LED), which is a well-known semiconductor light-emitting element that converts current into light, has been used as a light source for displaying an image in electronic devices including information communication devices together with a GaP:N-based green LED, starting with commercialization of a red LED using a GaAsP compound semiconductor in 1962. Therefore, a method of solving the above-described problems by implementing a display using the semiconductor light-emitting element may be proposed. Such a light-emitting diode has various advantages, such as a long lifespan, low power consumption, excellent initial driving characteristics, and high vibration resistance, compared to a filament-based light-emitting element.

Meanwhile, when a light-emitting module in which light-emitting elements are arranged in one dimension is rotated and driven at a high speed according to the angle thereof, various letters, graphics, and videos may be recognized by a human due to an afterimage effect.

In general, when still images are continuously displayed at a rate of 24 or more sheets per second, a viewer recognizes the same as a video. A conventional image display device, such as a CRT, an LCD, or a PDP, displays still images at a rate of 30 to 60 frames per second, so a viewer is capable of recognizing the same as a video. As the number of still images displayed per second increases, a viewer may experience smoother video.

As the number of still images displayed per second increases, a viewer may experience smoother video, and as the number of still images displayed per second decreases, it becomes difficult to implement smooth video.

One of the tasks to be accomplished in display devices, which are designed to realize an image by rotating light-emitting elements, is to improve a stereoscopic effect. A rotary-type display device has a characteristic in that the display thereof is transparent due to the nature of the structure thereof. Accordingly, it is possible to realize a multi-layer display surface using the characteristic.

In realization of a rotary-type display capable of conveying a stereoscopic effect using multiple layers, a task to be accomplished is to enable a moving image to be played while preventing light-emitting element arrays for realizing a display from overlapping each other.

DISCLOSURE

Technical Task

A technical task of the present disclosure is to provide a rotary-type display device using a semiconductor light-emitting element capable of improving the stereoscopic effect of the rotary-type display device.

Another technical task of the present disclosure is to provide a rotary-type display device using a semiconductor light-emitting element capable of playing a moving image while preventing light sources from overlapping each other.

Technical Solutions

In a first aspect for accomplishing the above tasks, the present disclosure provides a rotary-type display device using a light-emitting element, the rotary-type display device including a fixed portion including a motor, a rotary portion positioned on the fixed portion and rotated by the motor, and a light source module including at least two bar-shaped panels coupled to and extending radially from the rotary portion, and a light-emitting element array longitudinally disposed along the panel, wherein the at least two panels have different heights from the rotary portion.

Each of the at least two panels may include a coupler coupled to the rotary portion.

Each of the at least two panels may extend from a corresponding coupler.

The coupler may have an edge oriented parallel to a light-emitting element array of an adjacent panel.

The edge of the coupler may not interfere with the light-emitting element array of the adjacent panel.

The rotary portion may include an upper frame to which the light source module is coupled.

The upper frame may have at least one coupling hole into which the light source module is coupled.

The at least two panels may have height adjusters configured to position the at least two panels at different heights.

In a second aspect for accomplishing the above tasks, the present disclosure provides a rotary-type display device using a light-emitting element including a fixed portion including a motor, a rotary portion positioned on the fixed portion and rotated by the motor, and a light source module including at least two bar-shaped panels coupled to and extending radially from the rotary portion, and a light-emitting element array longitudinally disposed along the panel, wherein at least one of the at least two panels comprises a height adjuster configured to position the at least two panels at different heights.

Advantageous Effects

An embodiment of the present disclosure conveys the following effects.

First, because panels, which have a height difference therebetween, are disposed so as to prevent interference with adjacent panels, that is, to prevent overlapping of the adjacent panels, it is possible to maximize the feeling of depth or the stereoscopic effect of an image.

Furthermore, because a rotary-type display device is realized using panels, which have height differences therebetween and are provided with light-emitting arrays, it is possible to realize a multi-layer display, which includes a plurality of layers and which maintains transparency such that the panels do not interfere with each other.

Furthermore, the present disclosure conveys additional technical effects that have not been mentioned herein, and these effects will be understood by those skilled in the art from the entire matter of the specification and the accompanying drawings.

BEST MODE FOR DISCLOSURE

Reference will now be made in detail to embodiments of the present disclosure, examples of which are illustrated in the accompanying drawings. Wherever possible, the same reference numbers will be used throughout the drawings to refer to the same or like parts, and a redundant description thereof will be omitted. As used herein, the suffixes "module" and "unit" are added or used interchangeably to facilitate preparation of this specification, and are not intended to suggest distinct meanings or functions. In describing embodiments disclosed in this specification, relevant well-known technologies may not be described in detail in order to avoid obscuring the subject matter of the embodiments disclosed in this specification. In addition, it should be noted that the accompanying drawings are only for easy understanding of the embodiments disclosed in the present specification, and should not be construed as limiting the technical spirit disclosed in the present specification.

Furthermore, although the drawings are separately described for simplicity, embodiments implemented by combining two or more drawings are also within the scope of the present disclosure.

In addition, when an element such as a layer, a region, or a substrate is described as being "on" another element, it is to be understood that the element may be directly on the other element, or there may be an intermediate element between them.

The display device described herein conceptually includes all display devices that display information with a unit pixel or a set of unit pixels. Therefore, the term "display device" may be applied not only to finished products but also to parts. For example, a panel corresponding to a part of a digital TV also independently corresponds to the display device in the present specification. Such finished products include a mobile phone, a smartphone, a laptop computer, a digital broadcasting terminal, a personal digital assistant (PDA), a portable multimedia player (PMP), a navigation system, a slate PC, a tablet PC, an Ultrabook, a digital TV, a desktop computer, and the like.

However, it will be readily apparent to those skilled in the art that the configuration according to the embodiments described herein is also applicable to new products to be developed later as display devices.

In addition, the term "semiconductor light-emitting element" mentioned in this specification conceptually includes an LED, a micro LED, and the like, and may be used interchangeably therewith.

Figure 1:
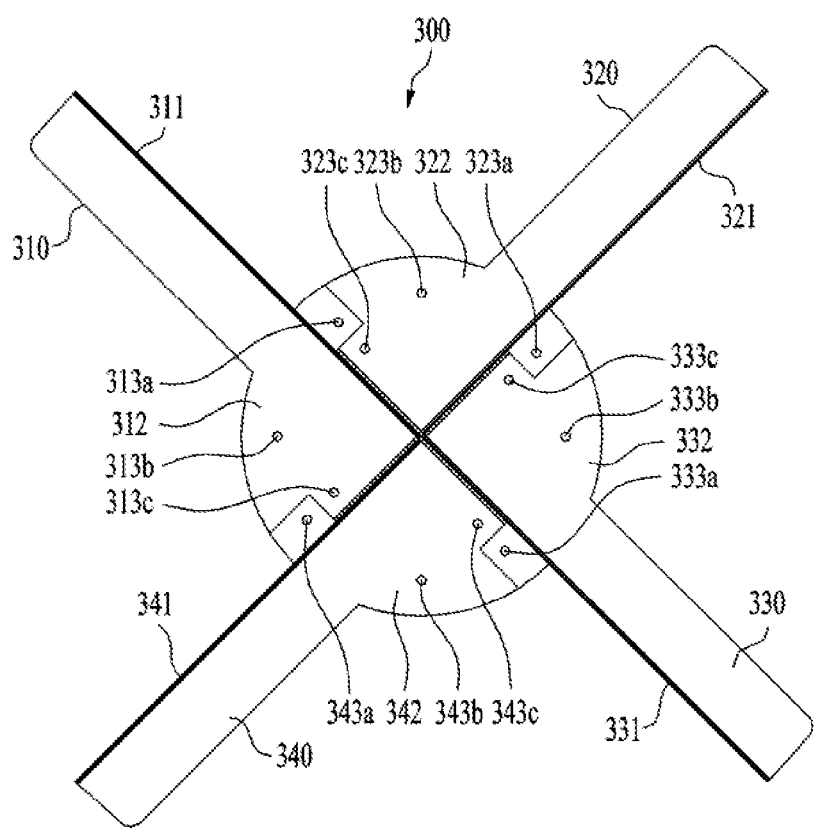
FIG. 1 is a plan view illustrating a rotary-type display device according to an embodiment of the present disclosure.
Figure 2:
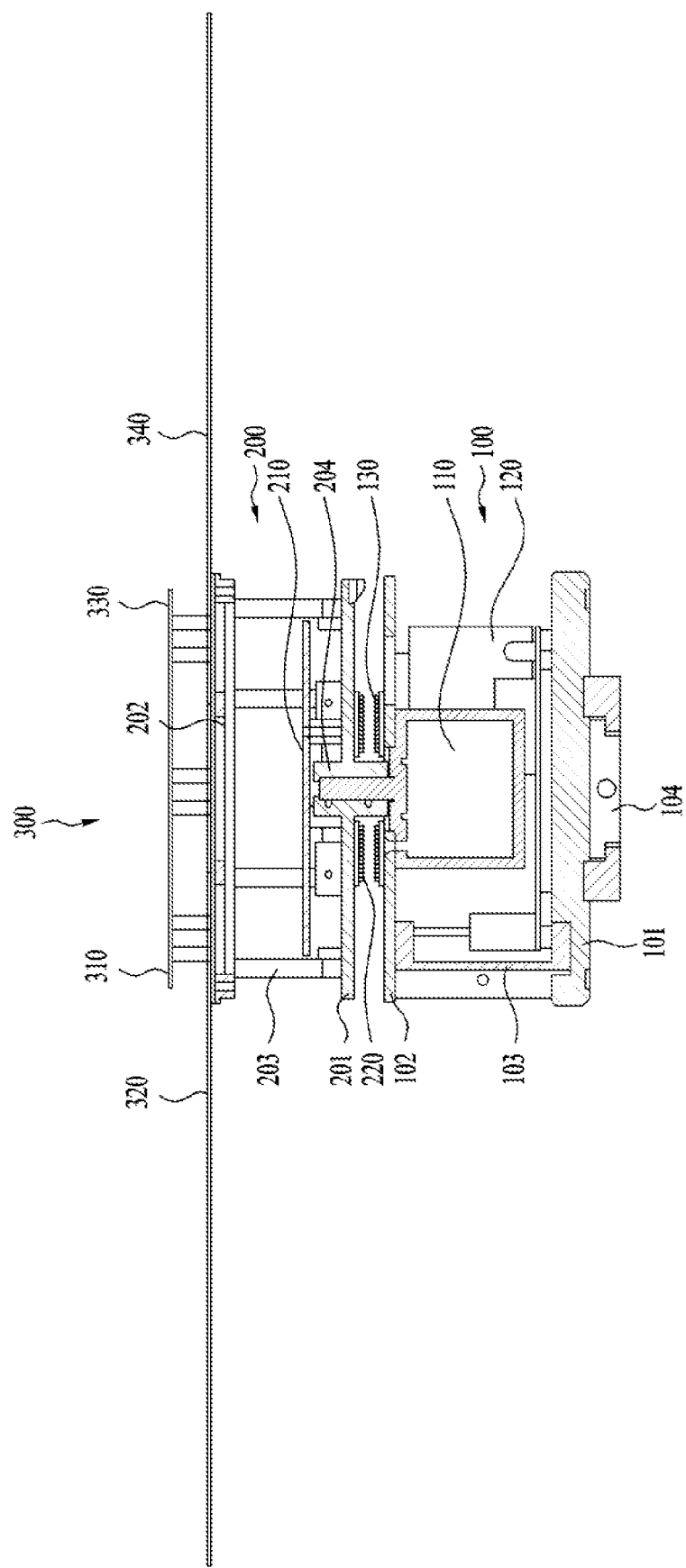
FIG. 2 is a side cross-sectional view illustrating the rotary-type display device according to an embodiment of the present disclosure.

FIG. 1 is a plan view illustrating a rotary-type display device according to an embodiment of the present disclosure. FIG. 2 is a side cross-sectional view illustrating the rotary-type display device according to an embodiment of the present disclosure.

FIG. 1 illustrates a rotary-type display device in which light-emitting element arrays 311, 321, 331, and 341 are respectively and longitudinally provided at wing-shaped panels 310, 320, 330, and 340.

Broadly speaking, the rotary-type display device may include a fixed portion 100 including a motor 110, a rotary portion 200, which is positioned on the fixed portion 100 and is rotated by the motor 110, and a light source module 300, which is coupled to the rotary portion 200 and includes the light-emitting element arrays 311, 321, 331, and 341 to embody a display configured to display an after-image by rotation thereof.

Here, the light source module 300 may include the light source module 300, which is embodied by one of more bar-shaped panels 310, 320, 330, and 340, which are radially disposed.

In FIG. 1, the light source module 300 may include four panels 310, 320, 330, and 340, each of which includes a corresponding one of the light-emitting element arrays 311, 321, 331, and 341. However, this embodiment is only one example, and the light source module 300 may include one or more panels.

The light-emitting element arrays 311, 321, 331, and 341 may be respectively and longitudinally disposed on the one or more bar-shaped panels 310, 320, 330, and 340, which are radially disposed about the rotational center.

Each of the panels constituting the light source module 300, may be embodied as a printed circuit board (PCB). In other words, each of the panels may have the function of a printed circuit board. The light-emitting array of each of the panels may constitute a unit pixel and may be arranged in the longitudinal direction of the panel.

The panel equipped with the light-emitting element array may be rotated so as to realize a display using an afterimage. Realization of the after-image will be described in detail later.

As mentioned above, the light source module 300 may be composed of the panels 310, 320, 330, and 340, on which the light-emitting element arrays 311, 321, 331, and 341 are respectively arranged.

Although the light source module 300 may be constituted by a plurality of first panels 310, 320, and 330, as described above, the light source module 300 may also be constituted by a single panel equipped with a light-emitting array. When the light source module 300 is constituted by a plurality of panels, as shown in FIG. 1, a plurality of sub-images, which are allocated to the plurality of panels, may realize one single frame image. Accordingly, the light source module 300 may be rotated at a rotational speed lower than in the case in which the same frame is realized by a single panel.

The fixed portion 100 may be composed of frame structures 101, 102, and 103. In other words, the fixed portion 100 may include a lower frame 101, an upper frame 102, and a connecting frame 103 connecting the lower frame 101 to the upper frame 102.

The frame structures 101, 102, and 103 may provide a space in which the motor 110 is mounted and a space in which a power supply 120, an RF module 126, and the like are mounted.

Furthermore, the fixed portion 100 may be provided with a weight (not shown) configured to reduce the influence of high-speed rotation of the rotary portion 200.

Similar to the fixed portion 100, the rotary portion 200 may also be composed of frame structures 201, 202, and 203. In other words, the rotary portion 200 may include a lower frame 201, an upper frame 202, and a connecting frame 203 connecting the lower frame 201 to the upper frame 202.

The frame structures 201, 202, and 203 may provide a space in which a drive circuit 210 configured to drive the light-emitting arrays 311, 321, 331, and 341 to realize a display is mounted.

The driving shaft of the motor 110 may be fixed to a shaft-fixing portion 204 formed at the lower frame 201 of the rotary portion 200. As a result, the driving shaft of the motor 110 may be positioned coaxially with the rotational center of the rotary portion 200.

The light source module 300 may be fixed to the upper sides of the frame structures 201, 202, and 203.

Power may be transmitted between the fixed portion 100 and the rotary portion 200 via wireless power transmission. To this end, a transmission coil 130 may be mounted on the upper side of the fixed portion 100 so as to transmit power in a wireless manner, and a receiving coil 220 may be mounted on the lower side of the rotary portion 200 at a position that faces the transmission coil 130.

According to an embodiment of the present invention, the panels 210, 320, 330 and 340, which constitute the light source module 300, may be positioned at different heights from the rotary portion 200. For example, at least two panels may be positioned at different heights from the rotary portion 200.

FIG. 2 illustrates an embodiment in which the height of the first panel 310 and the third panel 330 is different from the height of the second panel 320 and the fourth panel 340. In other words, the height of the first panel 310 and the third panel 330 from the rotary portion 200 may be higher than the height of the second panel 320 and the fourth panel 340.

Consequently, the height of the first light-emitting element array 311 and the third light-emitting element array 331, which are respectively provided at the first panel 310 and the third panel 330, may be higher than the height of the second light-emitting element array 321 and the fourth light-emitting element array 341, which are respectively provided at the second panel 320 and the fourth panel 340. As a result, the light-emitting element arrays 311, 321, 331, and 341, which have different heights, are capable of representing the feeling of depth of an image and thus of representing the stereoscopic effect of an image.

Referring to FIG. 1, at least some 310, 320, 330, and 340 of the panels may be coupled to the rotary portion 200 at different heights. For example, the panels 310, 320, 330, and 340 may be coupled to the upper frame 202 of the rotary portion 200.

Figure 3:
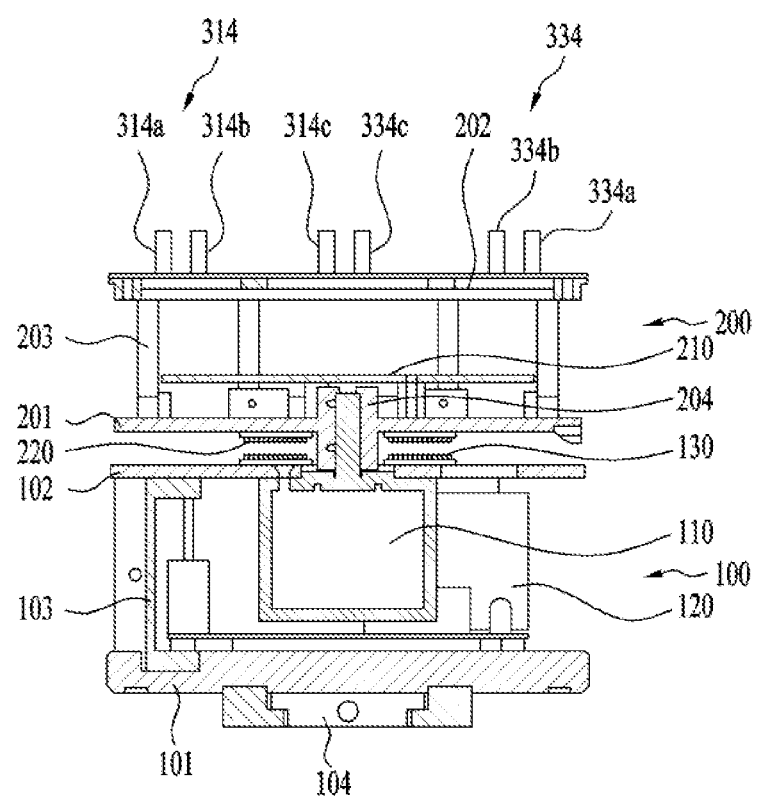
FIG. 3 is a side cross-sectional view illustrating the rotary-type display device according to an embodiment of the present disclosure.

Here, some of the panels, for example, the first panel 310 and the third panel 330, may be coupled to the upper frame 202 of the rotary portion 200 via respective height adjusters 314 and 334 (see FIG. 3). Consequently, the first panel 310 and the third panel 330, which are positioned opposite each other, may be mounted on the upper frame 202 of the rotary portion 200 at the same height, and the second panel 320 and the fourth panel 340, which are positioned opposite each other, may be mounted on the upper frame 202 of the rotary portion 200 at the same height.

The panels 310, 320, 330, and 340 may include respective couplers 312, 322, 332, and 342 coupled to the rotary portion 200 (or the upper frame 202). Although each of the panels 310, 320, 330, and 340 may have a bar shape as mentioned above, the couplers 312, 322, 332, and 342, which are connected to respective panels 310, 320, 330, and 340, may have a shape corresponding to portion of a circle.

When the light source module 300 includes four panels 310, 320, 330, and 340, as in the embodiment, each of the couplers 312, 322, 332, and 342, which are respectively connected to the four panels 310, 320, 330, and 340, may have a quadrant shape, which is one of four sectors constituting one circle and having ¼ the size of the circle. In other words, each of the couplers 312, 322, 332, and 342 may have two edge side that meet at the center of the circle at an angle of 90 degrees. In other words, each of the couplers 312, 322, 332, and 342 may include two edge sides, which have an included angle of 90 degrees therebetween. However, the included angle between the two edge sides may change depending on the number of the panels. For example, when there are three panels, the included angle between the two edge sides may be 120 degrees.

Here, one of the two edge sides may be parallel to the light-emitting element array mounted on the associated panel, and the other of the two edge sides may be parallel to the light-emitting element array mounted on an adjacent panel.

Specifically, the first panel 310 may be connected to the first coupler 312, and the first light-emitting element array 311 may be provided along the first panel 310 and the first coupler 313. Here, the first coupler 312 may have two edge sides, which respectively face two adjacent couplers (for example, the second coupler 322 and the fourth coupler 342). One of the two edge sides may be parallel to the first light-emitting element array 311, and the other of the two edge sides may be parallel to the fourth light-emitting element array 341 provided at the fourth panel 340.

Consequently, the edge sides of the first coupler 312 may not interfere with the light-emitting element array (the fourth light-emitting element array 341) of the adjacent panels (for example, the second panel 320 and the fourth panel 340).

As described above, because each of the panels 310, 320, 330, and 340 is mounted so as to avoid interfering with adjacent panels, that is, because the couplers 312, 322, 332, and 342, which are connected to respective panels 310, 320, 330, and 340, do not interfere with the light-emitting element arrays of adjacent panels, the panels 310, 320, 330, and 340 may be positioned at different heights.

The couplers 312, 322, 332, and 342 may extend from respective panels 310, 320, 330, and 340. In other words, the couplers 312, 322, 332, and 342 may be integrally formed with respective panels 310, 320, 330, and 340.

Referring to FIG. 1, each of the couplers 312, 322, 332, and 342 may have a mount hole configured to allow the associated coupler to be mounted to the upper frame 202 therethrough. For example, the first coupler 312 may have one or more mount holes 313a, 313b, and 313c, through which the first coupler 312 is mounted to the upper frame 202. Here, the mount holes 313a, 313b, and 313c may be respectively aligned with coupling holes or height adjusters 314, 324, 334, and 344 (see FIGS. 4 and 14) provided at the upper frame 202, which will be described in detail later.

Furthermore, the second coupler 322 may have therein one or more mount holes 323a, 323b and 32c, through which the second coupler 322 is mounted to the upper frame 202. Similarly to the second coupler 322, the third coupler 332 may have therein one or more mount holes 333a, 333b, and 333c, through which the third coupler 332 is mounted to the upper frame 202, and the fourth coupler 342 may have therein one or more mount holes 343a, 343b, and 343c, through which the fourth coupler 342 is mounted to the upper frame 202.

FIG. 3 is a side cross-sectional view illustrating the rotary-type display device according to an embodiment of the present disclosure.

FIG. 3 illustrates the state shown in FIG. 2, differing therefrom in that the panels 310, 320, 330, and 340 are removed, and specifically illustrates height adjusters 314 and 334 provided on the upper frame 202.

As mentioned above, the panels 310, 320, 330, and 340 may be mounted at different heights by means of the heat adjusters 314 and 334. Here, the height adjusters 314 and 334 may be mounted to the upper frame 202.

For example, the upper frame 202 may be provided with the height adjusters 314 and 334 or coupling holes.

As mentioned above, the first coupler 312 may have one or more mount holes 313a, 313b, and 313c, through which the first coupler 312 is mounted to the upper frame 202. Accordingly, the upper frame 202 may be provided with the height adjusters 314a, 314b, and 314c, which correspond to respective mount holes 313a, 313b and 314c.

Similarly, the third coupler 332 may have therein one or more mount holes 333a, 333b and 33c, through which the third coupler 332 is mounted to the upper fame 202, and the upper frame 202 may be provided with the height adjusters 334a, 334b, and 334c, which correspond to respective mount holes 333a, 333b, and 333c.

Meanwhile, the second coupler 322 and the fourth coupler 342 may be directly mounted into the coupling holes in the upper frame 202 rather than being provided with the height adjuster, thereby realizing panels positioned at different heights.

Figure 4:
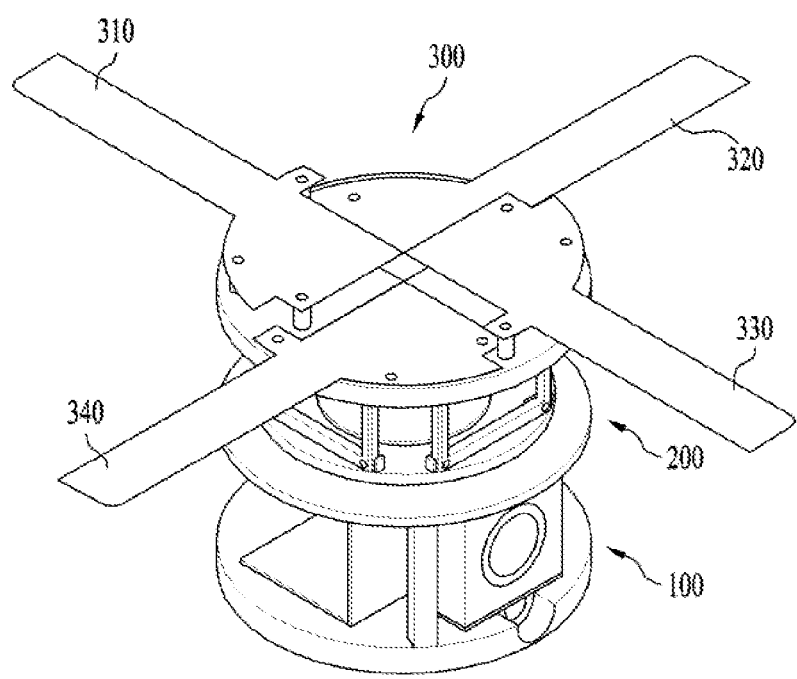
FIG. 4 is a perspective view illustrating the rotary-type display device according to an embodiment of the present disclosure.

FIG. 4 is a perspective view illustrating the rotary-type display device according to an embodiment of the present disclosure.

Referring to FIG. 4, as described above, the first panel 310 and the third panel 330 may be positioned at the same higher height, and the second panel 320 and the fourth panel 340 may be positioned at the same lower height.

Figure 5:
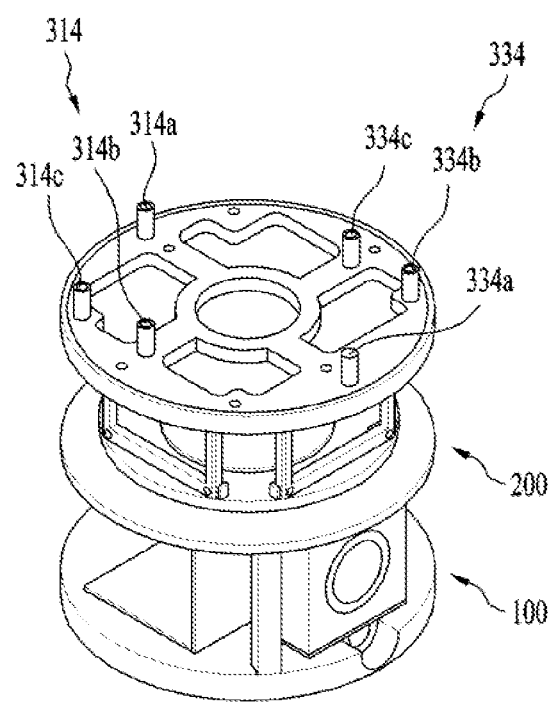
FIG. 5 is a perspective view illustrating the rotary-type display device according to an embodiment of the present disclosure.

FIG. 5 is a perspective view illustrating the rotary-type display device according to an embodiment of the present disclosure.

FIG. 5 illustrates the state shown in FIG. 4 from which the panels 310, 320, 330, and 340 are removed, and specifically illustrates the height adjusters 314 and 334 mounted to the upper frame 202. Each of the height adjusters 314 and 334 may have the shape of a column coupled into the coupling hole. For example, each of the height adjusters 314 and 334 may have the shape of a cylindrical column.

For example, there may be three height adjusters 314a, 314b, and 314c associated with the first coupler 312 and three height adjusters 334a, 334b, and 334c associated with the third coupler 332. The height adjusters 314 and 334 may be symmetrically positioned based on the center of the rotary portion 200.

Figure 6:
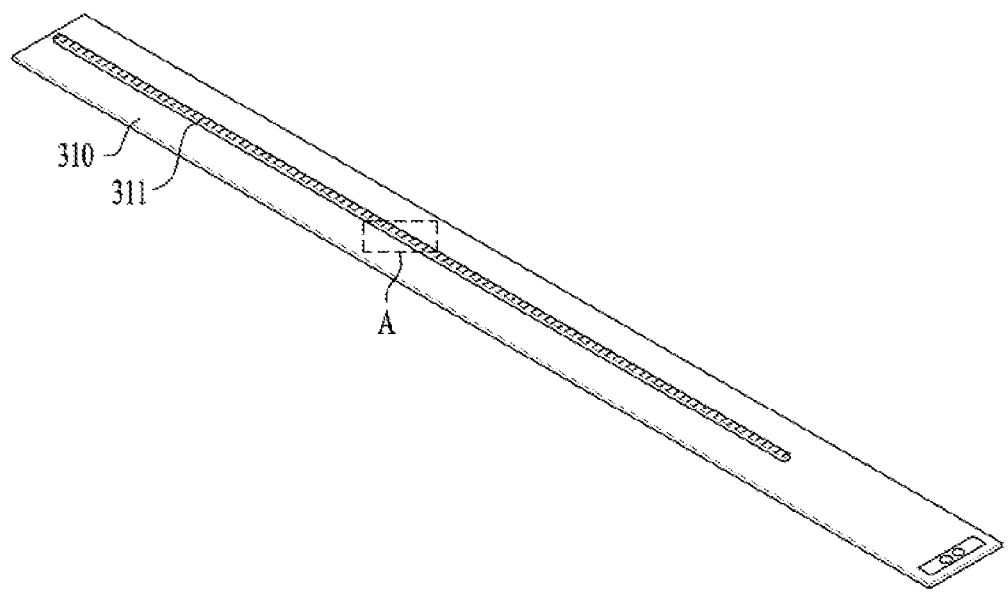
FIG. 6 is a perspective view illustrating the front surface of the light source module according to an embodiment of the present disclosure.
Figure 7:
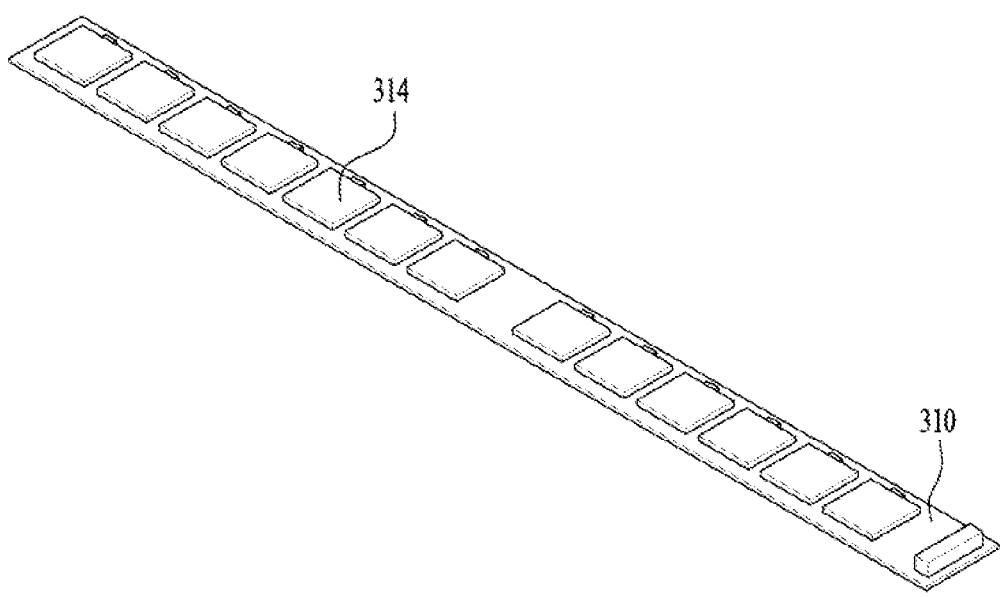
FIG. 7 is a perspective view illustrating the rear surface of the light source module according to an embodiment of the present disclosure.

FIG. 6 is a perspective view illustrating the front surface of the light source module according to an embodiment of the present disclosure. FIG. 7 is a perspective view illustrating the rear surface of the light source module according to an embodiment of the present disclosure.

FIG. 6 illustrates one panel 310 forming the light source module 300. As mentioned above, the panel 310 may be a printed circuit board (PCB). A plurality of light-emitting elements 312 (refer to FIG. 8) may be mounted on the panel 310 so as to be disposed in one direction to form pixels, thereby constituting the light-emitting element array 311. Here, a light-emitting diode (LED) may be used as the light-emitting element.

That is, the light-emitting elements 312 are disposed in one direction on one panel 310 to form individual pixels, with the result that the light-emitting element array 311 may be provided so as to be linearly mounted.

FIG. 7 illustrates the rear surface of the panel 310. Drivers 314 for driving the light-emitting elements 312 may be mounted on the rear surface of the panel 310, which constitutes the light source module.

Since the drivers 314 are mounted on the rear surface of the panel 310, as described above, the drivers 314 may not interfere with a light-emitting surface, the influence on light emission from the light sources (the light-emitting elements) 312 due to interference may be minimized, and the area of the panel 310 may be minimized. The panel 310, having a small area, may improve the transparency of the display.

Meanwhile, the front surface of the panel 310, on which the light-emitting element array 311 is mounted, may be processed into a dark color (e.g. black) in order to improve the contrast ratio and the color expression of the display, thereby maximizing the effect of the light sources.

Figure 8:
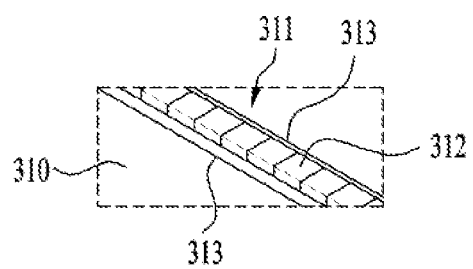
FIG. 8 is an enlarged view of portion A in FIG. 6.
Figure 9:
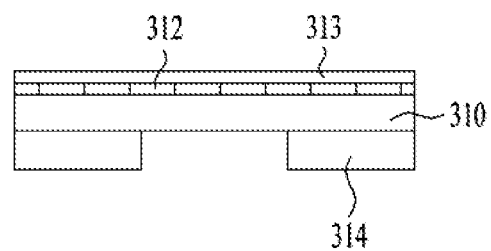
FIG. 9 is a cross-sectional view of the light source module according to an embodiment of the present disclosure.

FIG. 8 is an enlarged view of portion A in FIG. 6, and FIG. 9 is a cross-sectional view of the light source module according to the present disclosure.

Referring to FIG. 8, it can be seen that the individual light-emitting elements 312 are mounted linearly in one direction (the longitudinal direction of the panel). In this case, a protective portion 313 may be located outside the light-emitting elements 312 in order to protect the light-emitting elements 312.

Red, green, and blue light-emitting elements 312 may form one pixel in order to realize natural colors, and the individual pixels may be mounted in one direction on the panel 310.

Referring to FIG. 9, the light-emitting elements 312 may be protected by the protective portion 313. Further, as described above, the drivers 314 may be mounted on the rear surface of the panel 310, and may drive the light-emitting elements 312 in units of pixels or subpixels. In this case, one driver 314 may individually drive at least one pixel.

Figure 10:
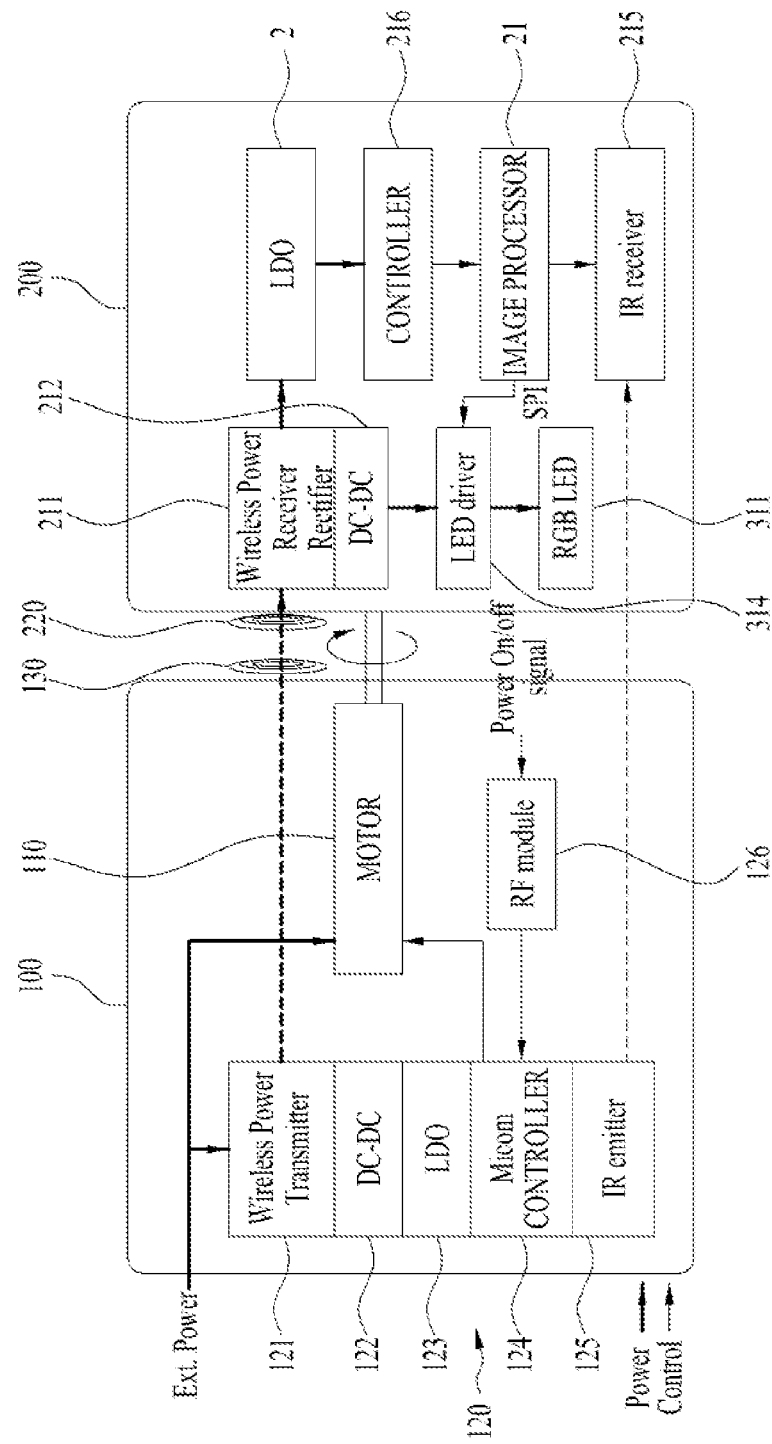
FIG. 10 is a block diagram of the rotary-type display device according to an embodiment of the present disclosure.

FIG. 10 is a block diagram of the rotary-type display device according to the present disclosure.

Hereinafter, a configuration for driving the rotary-type display device will be described briefly with reference to FIG. 10.

First, a driving circuit 210 may be mounted to the fixed portion 100. The driving circuit 120 may include a power supply. The driving circuit 120 may include a wireless power transmitter 121, a DC-DC converter 122, and a voltage generator 123 for supplying individual voltages.

External power may be supplied to the driving circuit 120 and the motor 110.

In addition, an RF module 126 may be provided at the fixed portion 100, so that the display may be driven in response to a signal transmitted from the outside.

Meanwhile, a means for sensing rotation of the rotary portion 200 may be provided at the fixed portion 100. Infrared radiation may be used to sense rotation. Accordingly, an IR emitter 125 may be mounted to the fixed portion 100, and an IR receiver 215 may be mounted to the rotary portion 200 at a position corresponding to the IR emitter 125.

In addition, a controller 124 may be provided at the fixed portion 100 in order to control the driving circuit 120, the motor 110, the IR emitter 125, and the RF module 126.

Meanwhile, the rotary portion 200 may include a wireless power receiver 211 for receiving a signal from the wireless power transmitter 121, a DC-DC converter 212, and a voltage generator (LDO) 213 for supplying individual voltages.

The rotary portion 200 may be provided with an image processor 216 in order to realize an image through the light-emitting element array using RGB data of an image to be displayed. The signal processed by the image processor 216 may be transmitted to the drivers 314 of the light source module, and thus an image may be realized.

In addition, a controller 214 may be mounted to the rotary portion 200 in order to control the wireless power receiver 211, the DC-DC converter 212, the voltage generator (LDO) 213, the IR receiver 215, and the image processor 216.

The image processor 216 may generate a signal for controlling light emission from the light sources of the light source module based on data of an image to be output. At this time, the data for light emission from the light source module may be internal data or external data.

The data stored in the internal device (the rotary portion 200) may be image data pre-stored in a storage device, such as a memory (an SD-card) mounted together with the image processor 216. The image processor 216 may generate a light emission control signal based on the internal data.

The image processor 216 may transmit control signals to the drivers 314 so that the light-emitting element arrays 311, 321, 331, and 341 display image data of a specific frame in a delayed manner.

Furthermore, the image processor 216 may transmit signals to the drivers 314 so as to control the light-emitting element arrays 311, 321, 331, and 341 to be sequentially activated.

Meanwhile, the image processor 216 may receive image data from the fixed portion 100. At this time, external data may be output through an optical data transmission device, such as a photo coupler, or an RF-type data transmission device, such as a Bluetooth or Wi-Fi device.

In this case, as mentioned above, a means for sensing rotation of the rotary portion 200 may be provided. That is, the IR emitter 125 and the IR receiver 215 may be provided as a means for detecting the rotational position (speed) of the rotary portion 200, such as an absolute rotational position or a relative rotational position, in order to output light source data suitable for each rotational position (speed) during rotation of the rotary portion 200. Alternatively, this function may also be achieved using an encoder, a resolver, or a Hall sensor.

Meanwhile, data required to drive the display may be transmitted as a signal in an optical manner at low cost using the principle of a photo coupler. That is, if the fixed portion 100 and the rotary portion 200 are provided with a light emitter and a light receiver, reception of data is continuously possible even when the rotary portion 200 rotates. Here, the IR emitter 125 and the IR receiver 215 described above may be used to transmit data.

As described above, power may be transferred between the fixed portion 100 and the rotary portion 200 in a wireless power transfer (WPT) manner.

Wireless power transfer enables the supply of power without connection of a wire using a resonance phenomenon of a coil.

To this end, the wireless power transmitter 121 may convert power into an RF signal of a specific frequency, and a magnetic field generated by current flowing through the transmission coil 130 may generate an induced current in the reception coil 220.

At this time, the natural frequency of the coil and the transmission frequency for transferring actual energy may differ from each other (a magnetic induction method).

Meanwhile, the resonant frequencies of the transmission coil 130 and the reception coil 220 may be the same (a magnetic resonance method).

The wireless power receiver 211 may convert the RF signal input from the reception coil 220 into direct current, and may transmit required power to a load.

Figure 11:
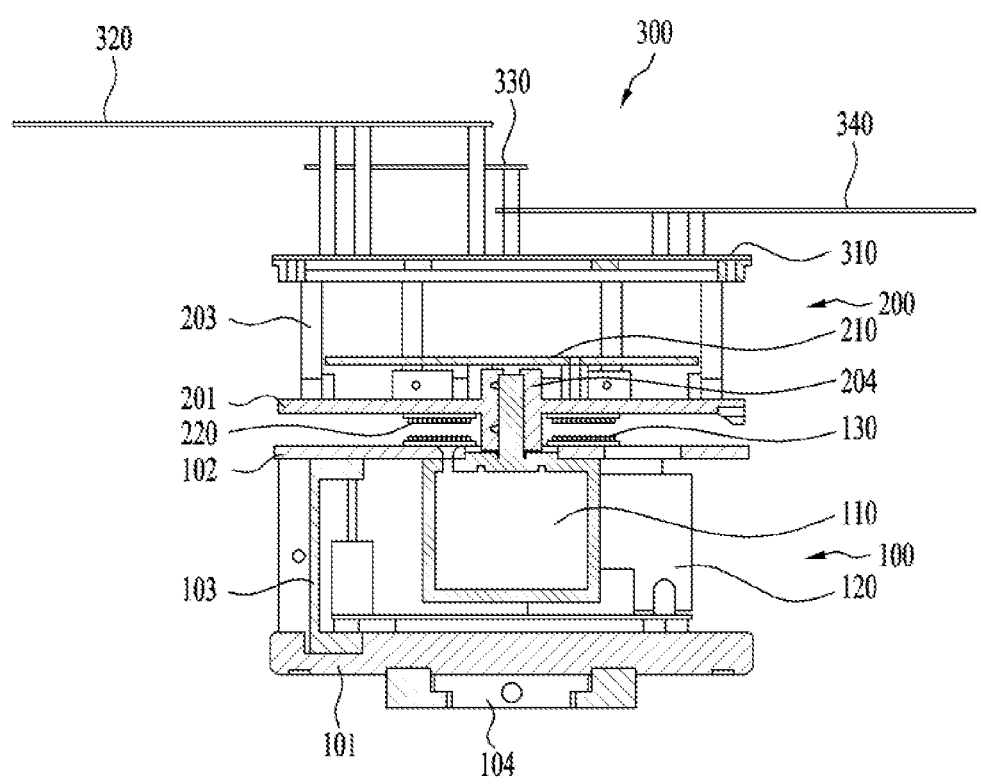
FIG. 11 is a side cross-sectional view illustrating a rotary-type display device according to another embodiment of the present disclosure.
Figure 12:
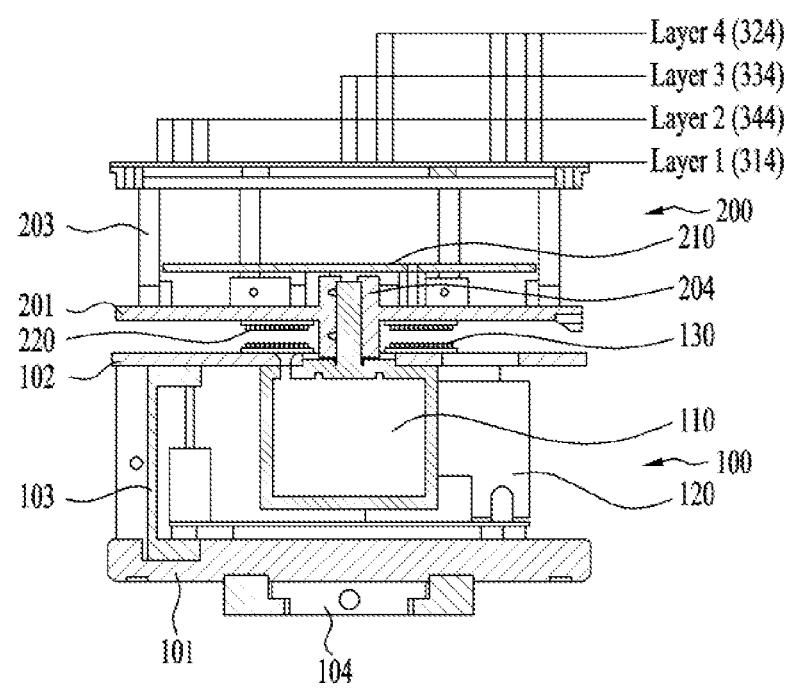
FIG. 12 is a side cross-sectional view illustrating the rotary-type display device according to another embodiment of the present disclosure.

FIG. 11 is a side cross-sectional view illustrating a rotary-type display device according to another embodiment of the present disclosure. FIG. 12 is a side cross-sectional view illustrating the rotary-type display device according to another embodiment of the present disclosure.

According to another embodiment of the present disclosure, the panels 310, 320, 330, and 340, which constitute the light source module 300, may have different heights from the rotary portion 200. For example, two or more of the panels may have different heights from the rotary portion 200.

FIG. 11 illustrates an embodiment in which the panels 310, 320, 330, and 340 may have different respective heights. In other words, FIG. 11 illustrates another embodiment in which the first panel 310, the second panel 320, the third panel 330, and the fourth panel 340 have different respective heights.

Specifically, the first panel 310, the second panel 320, the third panel 330, and the fourth panel 340 may be sequentially positioned at different respective heights in some order. For example, the height of the first panel 310, the height of the fourth panel 340, the height of the third panel 330, and the height of the second panel 320 from the rotary portion 200 may sequentially increase in that order. In other words, the distance to the first panel (Layer 1) 310, the distance to the fourth panel (Layer 2) 340, the distance to the third panel (Layer 3) 330, and the distance of the second panel (Layer 4) 320 from the rotary portion 200 may sequentially increase in that order.

Consequently, the first light-emitting element array 311, the fourth light-emitting element array 341, the third light-emitting element array 331, and the third light-emitting element array 331, which are respectively provided at the first panel 310, the fourth panel 340, the third panel 330, and the second panel 320, may sequentially increase in height.

Consequently, the embodiment is capable of realizing an image having four layers and thus of improving the sensation of depth or the stereoscopic effect of an image.

As described above, the panels 310, 320, 330, and 340 may be coupled to the upper frame 202 of the rotary portion 200.

Here, some of the panels, for example, the second panel 320, the third panel 330, and the fourth panel 340, may be coupled to the upper frame 202 of the rotary portion 200 via respective height adjusters 324, 334, and 344.

The panels 310, 320, 330, and 340 may include respective couplers 312, 322, 332, and 342, which are coupled to the rotary portion 200 (or the upper frame 202) (see FIG. 1). As mentioned above, although each of the panels 310, 320, 330, and 340 may have the shape of a bar, each of the couplers 312, 322, 332, and 342, which are connected to respective panels 310, 320, 330, and 340, may have the shape of a sector of a circle.

In this embodiment, in which the light source module 300 includes four panels 310, 320, 330, and 340, each of the couplers 312, 322, 332, and 342, which are connected to respective panels 310, 320, 330, and 340, may have the shape of a quadrant of a circle. In other words, each of the couplers 312, 322, 332, and 342 may have two edge sides that meet at the center of the circle at 90 degrees. In other words, each of the couplers 312, 322, 332, and 342 may have two edge sides that define a right angle therebetween. Here, reference numerals are used with reference to FIG. 1.

Here, one of the two edge sides may be parallel to the light-emitting element array provided at the associated panel, and the other of the two edge sides may be parallel to the light-emitting element array provided at an adjacent panel.

In a specific embodiment, the first panel 310 may be connected to the first coupler 312, and the first light-emitting element array 311 may be provided along the first panel 310 and the first coupler 312. Here, the first coupler 312 may have two edge sides that face adjacent couplers (for example, the second coupler 322 and the fourth coupler 342). One of the two edge sides may be parallel to the first light-emitting element array 311, and the other of the two edge sides may be parallel to the fourth light-emitting element array 341 provided at the fourth panel 340.

Consequently, the edge sides of the first coupler 312 may not interfere with the light-emitting element array (the fourth light-emitting element array 341) of adjacent panels (for example, the second panel 320 and the fourth panel 340).

Because each of the panels 310, 320, 330, and 340 may be mounted so as to prevent interference with adjacent panels, that is, because each of the couplers 312, 322, 332, and 342, which are connected to respective panels 310, 320, 330, and 340, does not interfere with the light-emitting element arrays of adjacent panels, the panels 310, 320, 330, and 340 may be positioned at different heights.

Each of the couplers 312, 322, 332, and 342 may have therein mount holes, through which the coupler is mounted to the upper frame 202 (see FIG. 1). For example, the first coupler 312 may have one or more mount holes 313*a*, 313*b*, and 313*c*, through which the first coupler 312 is mounted to the upper frame 202. Here, the mount holes 313*a*, 313*b*, and 313*c* may correspond to the coupling holes or the height adjusters 314, 324, 334, and 344 (see FIG. 14), which are provided at the upper frame 202.

Furthermore, the second coupler 322 may have one or more mount holes 323*a*, 323*b* and 323*c*, through which the second coupler 322 is mounted to the upper frame 202. Similarly to this, the third coupler 332 may have one or more mount holes 333*a*, 333*b*, and 333*c*, through which the third coupler 332 is mounted to the upper frame 202, and the fourth coupler 342 may have one or more mount holes 343*a*, 343*b*, and 343*c*, through which the fourth coupler 342 is mounted to the upper frame 202.

The couplers 312, 322, 332, and 342 and the mount holes, which have been described in the one embodiment of the present disclosure, may be similarly applied to this embodiment. Furthermore, a description of portions of this embodiment that are not described herein may be replaced with that of corresponding portions of the embodiment described above. Accordingly, a redundant description of this embodiment is omitted.

FIG. 12 illustrates the state shown in FIG. 11 from which the panels 310, 320, 330, and 340 are removed, and specifically illustrates the height adjusters 324, 334, and 344 mounted to the upper frame 202.

As mentioned above, the panels 310, 320, 330, and 340 may be mounted at different heights by means of the height adjusters 324, 334, and 344. Here, the height adjusters 324, 334, and 344 may be mounted to the upper frame 202.

Referring to FIG. 12, the first panel 310 may be directly mounted into the coupling hole 314 in the upper frame 202 so as to form a first layer (Layer 1). The fourth panel 340 may be mounted to the upper frame 202 via the fourth height adjuster 344 so as to form a second layer (Layer 2), which is higher than the first layer. The third panel 330 may be mounted via the third height adjuster 334 so as to form a third layer (Layer 3) higher than the second layer. The second panel 320 may be mounted via the second height adjuster 324 so as to form a fourth layer (Layer 4) higher than the third layer.

In this way, the panels 310, 320, 330, and 340 may be sequentially mounted to the upper frame 202 at different heights via the height adjusters 324, 334, and 344.

Figure 13:
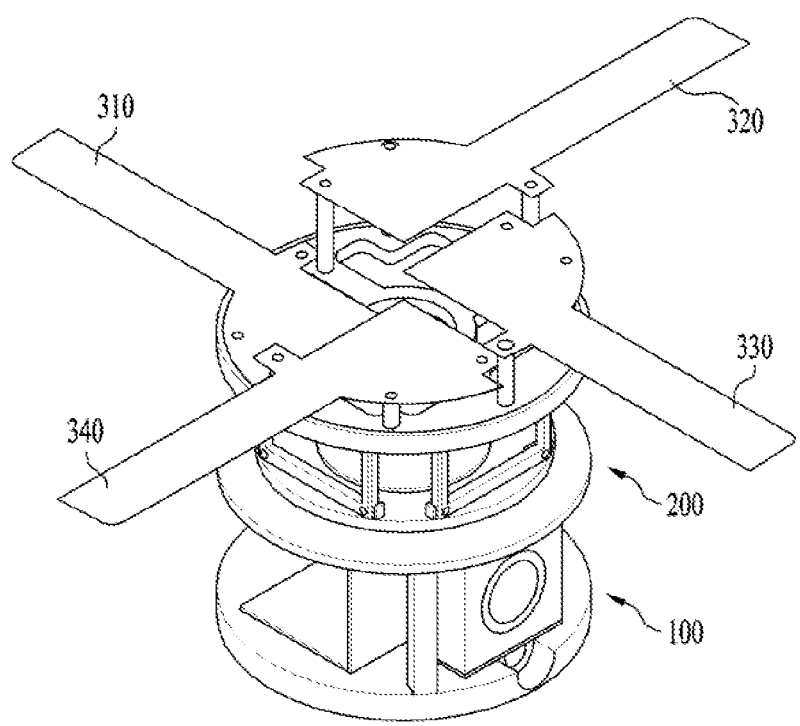
FIG. 13 is a perspective view illustrating the rotary-type display device according to another embodiment of the present disclosure.

FIG. 13 is a perspective view illustrating the rotary-type display device according to another embodiment of the present disclosure.

Referring to FIG. 13, as described above, the panels 310, 320, 330, and 340 may be sequentially mounted to the upper frame 202 at different heights via the height adjusters 324, 334, and 344.

Here, the light-emitting element arrays 311, 321, 331, and 341 (see FIG. 1), which are provided at respective panels 310, 320, 330, and 340, may be sequentially mounted at different heights so as to prevent interference with adjacent panels 310, 320, 330, and 340.

Figure 14:
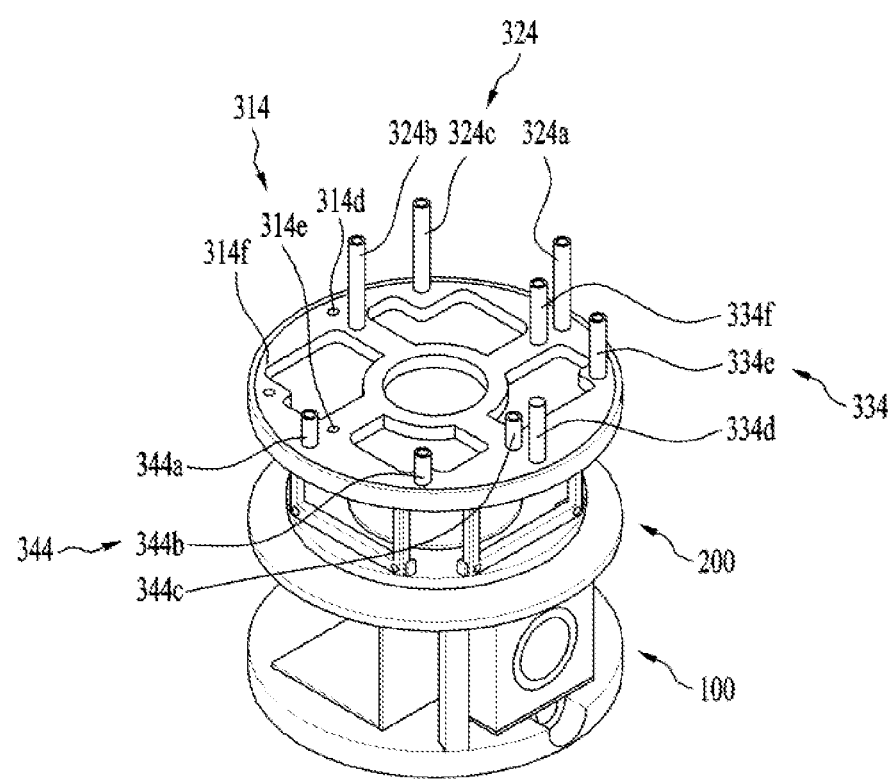
FIG. 14 is a perspective view illustrating the rotary-type display device according to another embodiment of the present disclosure.

FIG. 14 is a perspective view illustrating the rotary-type display device according to another embodiment of the present disclosure.

FIG. 14 illustrates the state shown in FIG. 13 from which the panels 310, 320, 330, and 340 are removed, and specifically illustrates the height adjusters 324, 334, and 344 mounted to the upper frame 202. Each of the height adjusters 324, 334, and 344 may have the shape of a column fitted into the coupling hole. For example, each of the height adjusters 324, 334, and 344 may have the shape of a cylindrical column.

For example, because the first panel 310 constitutes the lowest layer (the first layer), the three coupling holes 314*d*, 314*f*, and 314*e*, which correspond to the first coupler 312 of the first panel 310, may not be provided with the height adjuster, and the first coupler 312 of the first panel 310 may be directly coupled into the three coupling holes 314*d*, 314*f*, and 314*e*.

In this embodiment, because the fourth panel 340 constitutes the second layer, the fourth panel 340 may be provided with three height adjusters 344*a*, 344*b*, and 344*c* corresponding to the fourth coupler 342 of the fourth panel 340. Accordingly, the fourth coupler 342 of the fourth panel 340 may be coupled to the three height adjusters 344*a*, 344*b*, and 344*c*.

Furthermore, because the third panel 330 constitutes the third layer, the third panel 330 may be provided with three height adjusters 334*a*, 334*b*, and 334*c*, which are longer (higher) than the height adjusters 344*a*, 344*b*, and 344*c* corresponding to the fourth panel 340, and which correspond to the third coupler 332. Accordingly, the third coupler 332 of the third panel 330 may be coupled to the three height adjusters 334*a*, 334*b*, and 334*c*.

Meanwhile, because the second panel 320 constitutes the fourth layer, the second panel 320 may be provided with three height adjusters 324*a*, 324*b*, and 324*c*, which are longer (higher) than the height adjusters 334*a*, 334*b*, and 334*c* corresponding to the third panel 330, and which correspond to the second coupler 322.

As described above, because panels, which have height differences therebetween, are disposed so as to prevent interference with adjacent panels, that is, to prevent overlapping of the adjacent panels, it is possible to maximize the sensation of depth or the stereoscopic effect of an image.

For example, because a rotary-type display device is realized using panels that have height differences therebetween and are provided with light-emitting arrays, it is possible to realize a multi-layer display, which includes a plurality of layers and which maintains transparency in which the panels do not interfere with each other.

The above description is merely illustrative of the technical spirit of the present disclosure. It will be apparent to those skilled in the art that various modifications and variations can be made in the present disclosure without departing from the spirit and scope of the disclosure.

Therefore, the embodiments disclosed in the present disclosure are merely illustrative of the technical spirit of the present disclosure. The scope of the technical spirit of the present disclosure is not limited by these embodiments.

The scope of the present disclosure should be construed by the appended claims, and all technical ideas within the scope equivalent thereto should be construed as falling within the scope of the present disclosure.

INDUSTRIAL APPLICABILITY

According to the present disclosure, it is possible to provide a rotary-type display device using light-emitting diodes (LEDs), which are semiconductor light-emitting elements.

What is claimed is:

1. A rotary-type display device comprising:
a fixed portion including a motor;
a rotary portion positioned on the fixed portion and configured to be rotated by the motor;
a light source module including at least two elongated panels coupled to and extending radially from the rotary portion, and
height adjusters configured to position the at least two elongated panels of the light source module at different heights,
wherein each of the at least two elongated panels comprises a light-emitting element array longitudinally disposed along the panel,
wherein the at least two elongated panels are positioned at different heights.

2. The rotary-type display device of claim 1, wherein each of the at least two panels comprises a coupler coupled to the rotary portion.

3. The rotary-type display device of claim 2, wherein each of the at least two panels extends from a corresponding coupler.

4. The rotary-type display device of claim 2, wherein each coupler has an edge oriented parallel to a light-emitting element array of an adjacent panel.

5. The rotary-type display device of claim 4, wherein the edge of the coupler does not interfere with the light-emitting element array of the adjacent panel.

6. The rotary-type display device of claim 2, wherein the rotary portion comprises an upper frame to which the height adjuster is coupled.

7. The rotary-type display device of claim 6, wherein the upper frame has at least one coupling hole with which the light source module is coupled.

* * * * *